(12) United States Patent
Takagi et al.

(10) Patent No.: US 8,668,213 B2
(45) Date of Patent: Mar. 11, 2014

(54) DAMPER MOUNTING STRUCTURE

(75) Inventors: Kazuki Takagi, Wako (JP); Makoto Kihara, Wako (JP); Masanori Hayashi, Wako (JP); Noriaki Masuda, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/822,040

(22) PCT Filed: Aug. 8, 2011

(86) PCT No.: PCT/JP2011/068038
§ 371 (c)(1),
(2), (4) Date: Mar. 11, 2013

(87) PCT Pub. No.: WO2012/035907
PCT Pub. Date: Mar. 22, 2012

(65) Prior Publication Data
US 2013/0168941 A1    Jul. 4, 2013

(30) Foreign Application Priority Data

Sep. 14, 2010   (JP) ................................. 2010-206060

(51) Int. Cl.
*B60G 15/04*    (2006.01)
*B60G 15/06*    (2006.01)
*F16F 9/54*     (2006.01)
*F16F 1/373*    (2006.01)

(52) U.S. Cl.
CPC ............ B60G 15/067 (2013.01); B60G 15/063 (2013.01); *B60G 2204/128* (2013.01); *F16F 9/54* (2013.01); *F16F 1/3732* (2013.01)
USPC ....... 280/124.147; 280/124.145; 280/124.155

(58) Field of Classification Search
CPC .... B60G 15/063; B60G 15/067; B60G 13/06; B60G 13/02; B60G 2204/128; F16F 9/54; F16F 1/3732
USPC ..................... 280/124.145, 124.147, 124.155
See application file for complete search history.

(56) References Cited

U.S. PATENT DOCUMENTS

| | | | | |
|---|---|---|---|---|
| 4,298,193 A * | 11/1981 | Mourray | ........................ | 267/220 |
| 4,434,977 A * | 3/1984 | Chiba et al. | ..................... | 267/33 |
| 6,076,794 A * | 6/2000 | Pradel | ........................... | 267/220 |
| 6,260,836 B1 * | 7/2001 | Aoyama et al. | ............... | 267/221 |
| 6,286,820 B1 * | 9/2001 | Raulf et al. | ................ | 267/64.21 |
| 6,361,096 B2 * | 3/2002 | Kim | ............................. | 296/35.1 |
| 6,398,202 B1 * | 6/2002 | Schaible | ....................... | 267/220 |

(Continued)

FOREIGN PATENT DOCUMENTS

| | | | | |
|---|---|---|---|---|
| JP | 55140607 A | * 11/1980 | .............. | B60G 7/02 |
| JP | 08-085318 | 4/1996 | | |

(Continued)

*Primary Examiner* — Nicole Verley
(74) *Attorney, Agent, or Firm* — Rankin, Hill & Clark LLP

(57) ABSTRACT

A damper mounting structure is provided with a top buffer member and a bottom buffer member. The bottom buffer member has a protruding section that protrudes with an outer diameter smaller than the outer diameter of the bottom buffer member. The damper mounting structure mates with the protruding section and is anchored to a vehicle body panel, and is provided with a collar formed at substantially the same height as the height of the protruding section. The corner of an opening formed on the vehicle body panel, which comes into contact with the top buffer member, is chamfered.

18 Claims, 7 Drawing Sheets

(56) References Cited

U.S. PATENT DOCUMENTS

| | | | |
|---|---|---|---|
| 6,910,671 B1* | 6/2005 | Norkus et al. | 248/635 |
| 7,048,265 B2* | 5/2006 | Huprikar | 267/141.1 |
| 7,178,795 B2* | 2/2007 | Huprikar et al. | 267/141.1 |
| 7,261,365 B2* | 8/2007 | Dickson et al. | 296/190.07 |
| 7,347,414 B2* | 3/2008 | Groves | 267/220 |
| 7,712,730 B2* | 5/2010 | Fabrizio | 267/152 |
| 7,735,812 B2* | 6/2010 | Fitzgerald | 267/293 |
| 7,938,418 B1* | 5/2011 | Coombs et al. | 280/124.147 |
| 8,167,283 B2* | 5/2012 | Huprikar et al. | 267/141.2 |
| 8,226,066 B2* | 7/2012 | Kubat et al. | 248/634 |
| 8,333,269 B2* | 12/2012 | Dickson et al. | 188/321.11 |
| 2004/0135301 A1* | 7/2004 | Handke et al. | 267/293 |
| 2005/0133322 A1* | 6/2005 | Huprikar et al. | 188/321.11 |
| 2008/0001336 A1* | 1/2008 | Groves | 267/221 |
| 2008/0012263 A1* | 1/2008 | Dickson et al. | 280/124.155 |

FOREIGN PATENT DOCUMENTS

| | | |
|---|---|---|
| JP | 11-170836 | 6/1999 |
| JP | 2003-042217 | 2/2003 |
| JP | 2007-162752 | 6/2007 |
| JP | 2007-276661 | 10/2007 |
| JP | 2008-075735 | 4/2008 |
| JP | 2009-085300 | 4/2009 |

* cited by examiner

DAMPER MOUNTING STRUCTURE

TECHNICAL FIELD

The present invention relates to a damper mount structure including a vehicular body and a damper of a suspension system, the damper having an end fastened to the vehicular body through damping members.

BACKGROUND ART

A damper mount structure including a rod of a damper, a vehicular body member and a rubber interposed between the rod and the vehicular body member is known in the art, as disclosed in JP-A-2007-162752.

As for the damper mount structure disclosed in JP-A-2007-162752, a rod of a damper is covered by a rubber extending through an opening portion of a vehicular body member. A tubular retaining member fits in the opening portion and is interposed between the rubber and the opening portion for retaining the rubber in a vicinity of the opening. This prevents contact between the vehicular body member and the rod.

It is desirable to reduce the number of parts of a damper mount structure and facilitate assemblage of the damper mount structure without using such a part as the tubular retaining member interposed between the opening portion and the rubber. It is also desirable to limit stress concentration occurring in a rubber (a damping member) of the damper mounts structure.

PRIOR ART LITERATURE

Patent Literature

Patent Literature 1: JP-A-2007-162752

SUMMARY OF INVENTION

Technical Problem

An object of the present invention is to provide a damper mount structure which is formed by the reduced number of parts and easy to assemble, the damper mount structure being designed to reduce stress concentration.

Solution to Problem

According to one aspect of the present invention, there is provided a damper mount structure comprising: a rod of a damper of a suspension system, the rod having an end portion; a vehicular body panel having an opening portion, the end portion of the rod being inserted through and fastened to the opening portion; an upper stationary disk facing toward an upper surface of the vehicular body panel and subjected to a pressure of a nut screwed onto the end portion of the rod; a lower stationary disk facing toward a lower surface of the vehicular body panel and opposed to the upper stationary disk with the vehicular body panel interposed between the upper stationary disk and the lower stationary disk; an annular upper damping member contacting the vehicular body panel and compressed by the upper stationary disk, the end portion of the rod fitting through the annular upper damper; an annular lower damping member disposed between the vehicular body panel and the lower stationary disk in contact with the lower stationary disk; an annular projection protruding from one of the upper damping member and the lower damping member toward the other one of the upper damping member and the lower damping member, the projection having an outer diameter smaller than an outer diameter of the one of the upper damping member and the lower damping member; and a collar having an inner circumferential surface fitting around an outer circumferential surface of the projection in such a manner as to contact the outer circumferential surface, the collar having one end surface and an opposite end surface, the one end surface being contiguous with the inner circumferential surface and fixed to the vehicular body panel, the collar having a height from the opposite end surface to the one end surface, the height of the collar being substantially equal to a height of the projection; and the opening portion of the vehicular body panel contacting the other one of the upper damping member and the lower damping member and having a beveled corner.

Preferably, the vehicular body panel has a lower surface facing downwardly of a vehicle, the projection is formed on the lower damping member, the collar is integrally fixed to the lower surface of the vehicular body panel, and the beveled corner is contiguous with the upper surface of the vehicular body panel and faces toward the upper damping member.

Preferably, the damper mount structure further comprises a rubber cover covering the lower damping member and the projection, the rubber cover being interposed between the collar and the lower damping member and between the collar and the projection.

Preferably, the damper mount structure further comprises a water entry preventing mechanism formed between the collar and the rubber cover for preventing entry of water from an underside of a vehicle, the mechanism including a rib formed on one of the collar and the rubber cover and a groove formed on the other one of the collar and the rubber cover and receiving the rib in close contact with the rib.

Preferably, the vehicular body panel comprises a damper base contiguous with a vehicular body, and a damper stiffener overlying the damper base and contacting the upper damping member, the damper mount structure further comprising a watertight sealer interposed between the collar and the damper base, the collar being fixed to the damper base by projection welding.

Preferably, the damper stiffener is joined to the damper base by adhesives.

Preferably, the upper damping member and the lower damping member are made from urethane rubber.

Advantageous Effects of Invention

When the annular lower damping member is radially outwardly pressed by a load applied to the rod, the projection transmits the load to the collar, and then the load is dispersed by the collar into the vehicular body panel. This means that the transmission of the load into the vehicular body panel can be achieved without any tubular member being interposed between the projection formed on the lower damping member and the collar. Since the damper mount structure does not require such a tubular member, the number of parts of the damper mount structure is smaller and the damper mount structure can be easily assembled.

The beveled corner of the opening portion can reduce stress concentration occurring in the upper damping member along an edge of the opening portion.

When the annular lower damping member is radially outwardly pressed by a load applied to the rod, the load is transmitted from the outer circumferential surface of the projection to the inner circumferential surface of the collar. During the transmission of the load, because the collar and the projection are approximately the same in height, the outer circumferential surface of the projection is in contact with only the inner circumferential surface of the collar without contacting a corner of the collar contiguous with the inner circumferential surface. Since the corner of the collar is not pressed against the outer circumferential surface of the projection along the length of the corner, no stress concentration occurs in the projection.

The collar fixed to the lower surface of the vehicular body panel and the projection fitting in the collar jointly define a gap therebetween. This gap is in the form of a small curve providing a labyrinth structure (adapted to prevent leakage). This makes it possible to prevent entry of water from an underside of the vehicular body panel such as a road surface to the vehicular body panel.

The rubber cover covering the lower damping member and the projection is interposed between the collar and the lower damping member and between the collar and the projection, thereby preventing entry of water from the underside of the vehicular body panel such as a road surface to the vehicular body panel.

The water entry preventing mechanism is formed between the collar and the rubber cover for preventing entry of water from an underside of a vehicle. The mechanism includes the rib formed on one of the collar and the rubber cover and the groove formed on the other one of the collar and the rubber cover and receiving the rib in close contact with the rib. The close contact between the rib and the groove is established by a pressure exerted by the rib on the groove, thereby preventing entry of water from underside of the vehicular body panel such as a road surface to the vehicular body panel.

The vehicular body panel comprises the damper base contiguous with the vehicular body, and the damper stiffener overlying the damper base and contacting the upper damping member. The damper mount structure further comprising the watertight sealer interposed between the collar and the damper base, and the collar is fixed to the damper base by projection welding. The sealer prevents water from entering between the collar and the damper base.

The projection welding can maintain flatness of a (lower) surface of the damper base contacting the collar. That is, the collar can be fixed to the vehicular body panel without deteriorating the (lower) surface of the damper base contacting the collar. If spot welding is used to weld the collar and the vehicular body panel together in pace of the projection welding, irregularities would be undesirably formed by heat at a first spot on the surface of the damper base contacting the collar.

Since the damper stiffener is joined to the damper base by the adhesive, the flatness of the surface of the damper base contacting the collar can be reliably maintained. As a result, the collar can be fixed to the vehicular body panel without deteriorating the flatness of the surface of the damper base contacting the collar.

The urethane rubber can provides the upper and lower damping members with a better damping function than other types of rubber used in cushion members.

DESCRIPTION OF EMBODIMENTS

Certain preferred embodiments of the present invention are described below with reference to the accompanying drawings.

Embodiment 1

Figure 1:
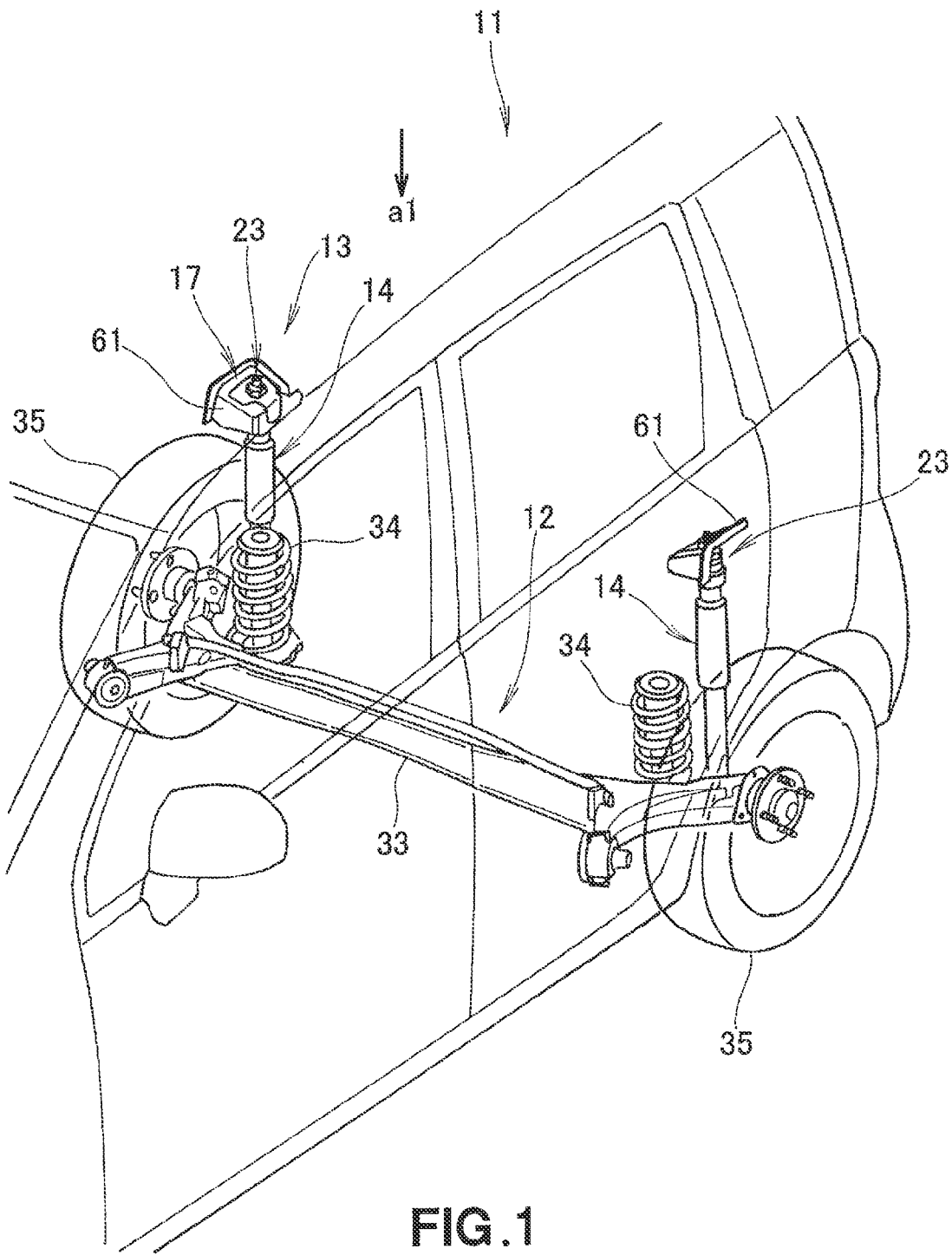
FIG. 1 is a perspective view of a rear suspension system employing a damper mount structure in a first embodiment of the present invention.
Figure 2:
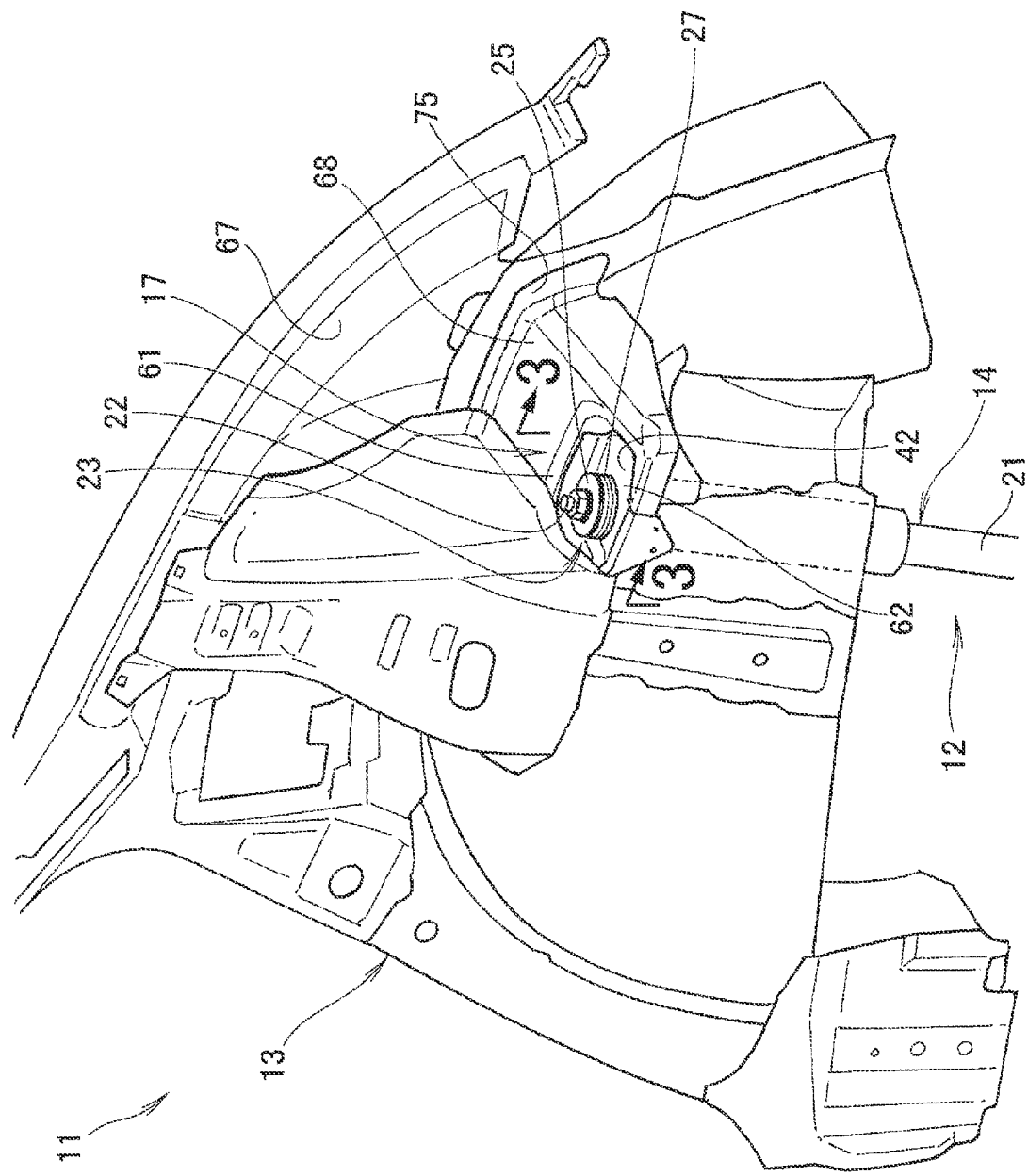
FIG. 2 is a perspective view of the damper mount structure shown in FIG. 1.

Referring to FIG. 1 and FIG. 2, a damper mount structure in an embodiment 1 is used in a rear suspension system 12 of a vehicle 11. The rear suspension system 12 includes a damper 14 fastened to a vehicular body 13 of the vehicle 11. The vehicular body 13 is provided with a vehicular body panel 17 to which is attached a mounting shaft portion 22 formed distally of a rod 21 of the damper 14. Attached to the mounting shaft portion 22 is a damping mechanism 23.

Figure 3:
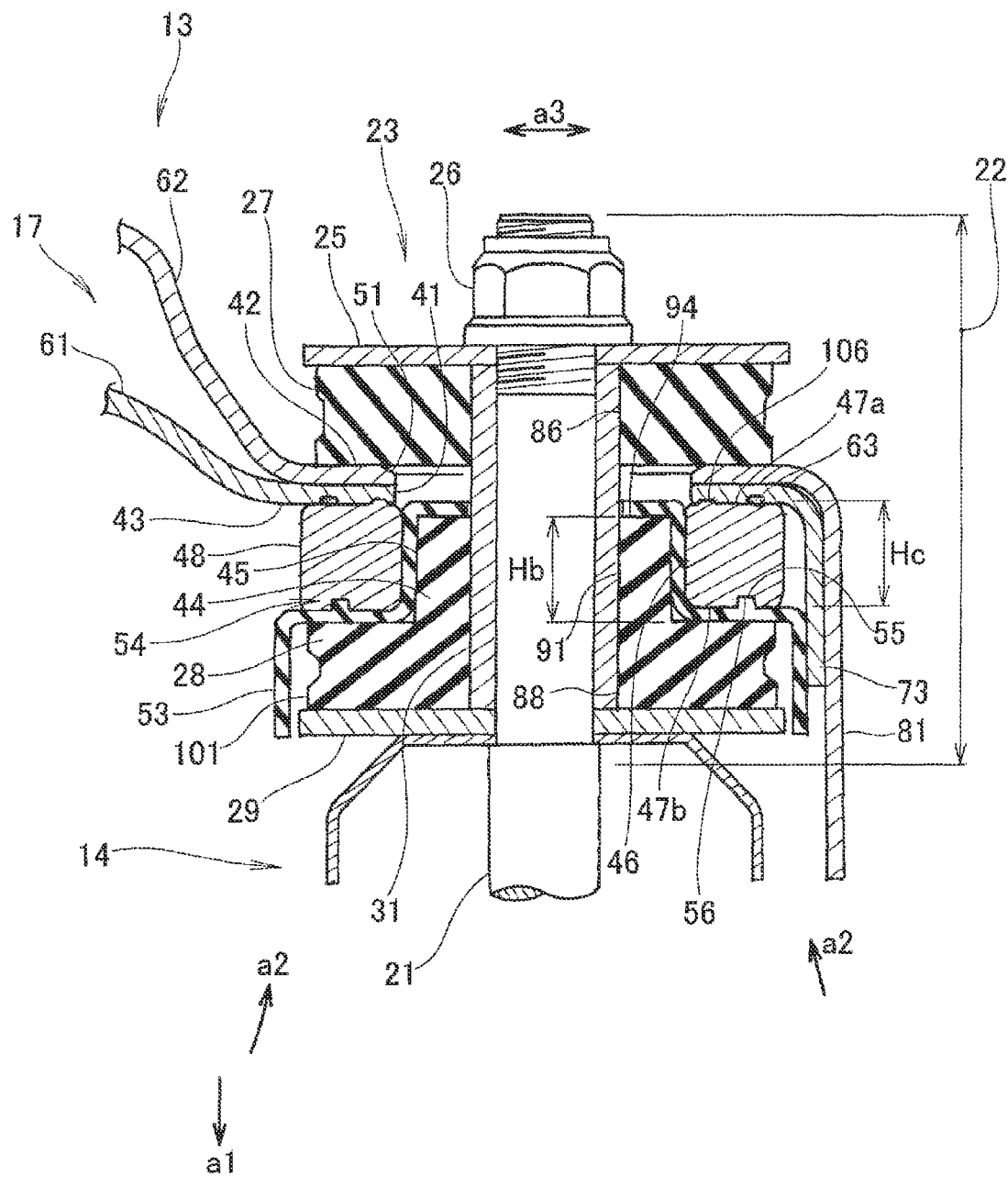
FIG. 3 is an enlarged cross-sectional view taken along line 3-3 of FIG. 2.
Figure 4:
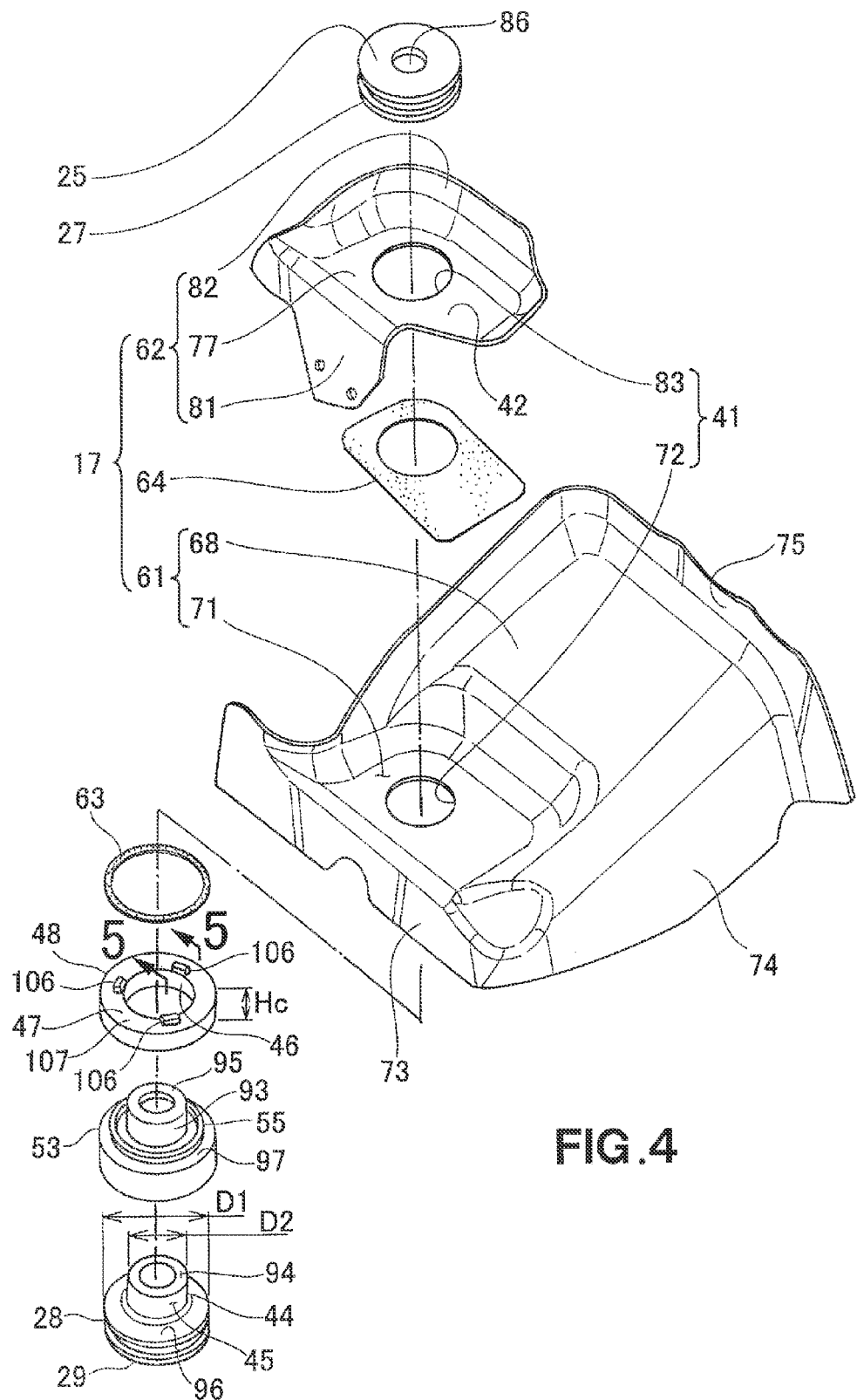
FIG. 4 is an exploded perspective view of the damper mount structure shown in FIG. 3.

As shown in FIGS. 3 and 4, an upper stationary disk 25 is tightened by a nut 26 to press an upper damping member 27 against the vehicular body panel 17. The upper stationary disk 25 cooperates with a lower damping member 28 to hold the mounting shaft portion 22 of the damper 14 to the vehicular body panel 17.

A lower stationary disk 29 is integrally fixed to the mounting shaft portion 22. A sleeve member 31 is attached to the lower stationary disk 29. A tightening force (axial force) exerted by the nut 26 is transmitted through the sleeve member 31 to the lower stationary disk 29.

As shown in FIG. 1, the damper 14 has a lower end connected to an axle beam 33 to which is attached a coil spring 34. Reference numeral 35 denotes a rear wheel. The damper 14 is a conventional one. The rear suspension system 12 is symmetrically arranged with respect to a longitudinal centerline of the vehicle 11. The damper structure is provided in a pair and the pair of the damper structures are also symmetrically arranged with respect to the longitudinal centerline of the vehicle 11.

The damper mount structure is discussed below with reference to FIG. 2 to FIG. 6.

The damper mount structure includes the rod 21 of the damper 14 of the rear suspension system 12, and the vehicular body panel 17 having an opening portion 41. The mounting shaft portion 22 (end portion) of the rod 21 is inserted through and fastened to the opening portion 41. The damper mount structure also includes an upper stationary disk 25 facing toward an upper surface 42 of the vehicular body panel 17 and subjected to a pressure of the nut 26 screwed onto the mounting shaft portion 22.

The damper mount structure further includes the lower stationary disk 29 disposed below a lower surface 43 (FIG. 3) of the vehicular body panel 17 in opposed relation to the upper stationary disk 25 with the vehicular body panel 17 interposed between the lower stationary disk 29 and the upper stationary disk 25. In addition, the damper mount structure includes the annular upper damping member 27 fitting around the mounting shaft portion 22 and compressed by the upper stationary disk 25 in contact with the vehicular body panel 17. The damper mount structure further includes the annular lower damping member 28 fitting around the mounting shaft portion 22 and disposed between the vehicular body panel 17 and the lower stationary disk 29 in contact with the lower stationary disk 29.

Furthermore, the damper mount structure includes an annular projection 44 protruding from the lower damping member 28 (one of the lower and upper damping members) toward the upper damping member 27 (the other one of the lower and upper damping members). The annular projection 44 has an outer diameter D2 smaller than an outer diameter D1 of the lower damping member 28. Moreover, the damper mount structure includes a collar 48 having an inner circumferential surface 46 fitting around an outer circumferential surface 45 of the projection 44 in such a manner as to contact the outer circumferential surface 45. The collar 48 has an upper surface 47a contiguous with the inner circumferential surface 46 and fixed to the vehicular body panel 17. The collar 48 has a height Hc between a lower surface 47b and the upper surface 47a (an end surface 47). The height Hc is approximately equal to a height Hb of the projection 44. Additionally, the opening portion 41 contacting the upper damping member 27 has a beveled corner 51.

The expression "the inner circumferential surface 46 fitting around the outer circumferential surface 45 in such a manner as to contact the outer circumferential surface 45" means that the inner circumferential surface 46 has portions contacting the outer circumferential surface 45 and portions slightly spaced from the outer circumferential surface 45.

The lower surface 43 of the vehicular body panel 17 faces in a direction of an arrow a1, or downwardly of the vehicle 11 having the vehicular body panel 17. The projection 44 is formed on the lower damping member 28. The collar 48 is integrally fixed to the lower surface 43 of the vehicular body panel 17. The beveled corner 51 is contiguous with the upper surface 42 of the vehicular body panel 17 and faces toward the upper damping member 27.

The lower damping member 28 and the projection 44 are covered by a rubber cover 53. The rubber cover 53 is interposed between the collar 48 and the lower damping member 28 and between the collar 48 and the projection 44. The beveled corner 51 contacts the rubber cover 53.

Provided between the collar 48 and the rubber cover 53 is a water entry preventing mechanism 54 for preventing water below the vehicle 11 to enter toward the vehicular body panel 17, as indicated by an arrow a2. The water entry preventing mechanism 54 includes a rib 55 formed on the rubber cover 53 and a groove 56 formed on the collar 48 and receiving the rib 55 in close contact with the rib 55.

The vehicular body panel 17 includes a damper base 61 contiguous with the vehicular body 13, and a damper stiffener 62 overlying the damper base 61 and contacting the upper damping member 27. Interposed between the collar 48 and the damper base 61 is a watertight sealer 63. The collar 48 is fixed to the damper base 61 by projection welding.

The sealer 63 is typically liquid and thin. That is, no groove need not be formed on the damper base 61 in correspondence to the sealer 63.

The damper stiffener 62 is joined to the damper base 61 by an adhesive 64. The upper and lower damping members 27, 28 are made from urethane rubber (polyurethane rubber).

As shown in FIG. 2 and FIG. 4, the damper base 61 includes a base body 68 extending from an inner panel 67 of the vehicular body 13. The base body 68 defines a first fastening seat 71 to which is fastened the mounting shaft portion 22 (FIG. 3) of the rod 21 of the base body 68.

The first fastening seat 71 has a first opening portion 72 forming the opening portion 41. The base body 68 is provided with a first rib 73, a second rib 74 and a joining flange 75 which are perpendicular to the base body 68. The joining flange 75 overlaps and is joined to the inner panel 67 of the vehicle 13. The damper stiffener 62 adheres to the first fastening seat 71 by the adhesive 64.

The damper stiffener 62 has a second fastening seat 77 shaped to contact the first fastening seat 71. The damper stiffener 62 further includes third and fourth ribs 81, 82 contiguous with the second fastening seat 77. The third rib 81 is shaped to contact the first rib 73 of the damper base 61.

The third rib 81 is joined to the first rib 73 by the adhesive 64. The second fastening seat 77 defines a second opening portion 83 concentric with the first opening portion 72. The first and second opening portions 72, 83 cooperate with each other to define the opening portion 41. The second opening portion 83 has the beveled corner 51, as shown in FIG. 3. The beveled corner 51 is inclined at, for example, 45 degrees from a bottom surface of the upper damping member 27.

The upper damping member 27 is circular disk-shaped and has a first through-hole 86 formed centrally thereof. The first through-hole 86 has a diameter set to allow passage of the sleeve member 31 (FIG. 3) therethrough. The lower damping member 28 is approximately identical to the upper damping member 27. The lower damping member 28 has a second through-hole 88, as shown in FIG. 3. The projection 44 is formed integrally with the lower damping member 28.

The projection 44 has a tubular shape extending a height Hb from the lower damping member 28. The projection 44 has a third through-hole 91 contiguous and concentric with the second through-hole 88 of the lower damping member 28. The rubber cover 53 overlies the projection 44 and the lower damping member 28.

Figure 6A:
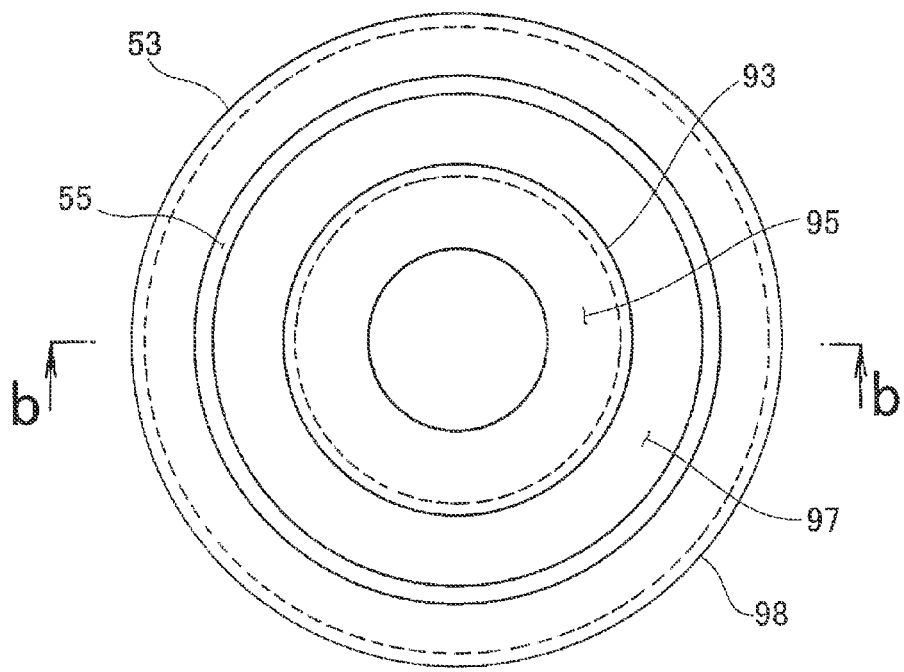
FIG. 6A is a plan view of a rubber cover shown in FIG. 3.

As shown in FIGS. 3, 4 and 6, the rubber cover 53 includes a small tubular portion 93 adapted to contact the outer circumferential surface 45 of the projection 44. The rubber cover 53 also includes a first cover portion 95 defining a small end surface of the rubber cover 53. The first cover portion 95 is adapted to contact an end surface 94 contiguous with the outer circumferential surface 45 of the projection 44. The rubber cover 53 further includes a second cover portion 97 defining a larger end surface of the rubber cover 53. The second cover portion 97 is contiguous with the small tubular portion 93 and is adapted to contact an end surface 96 of the lower damping member 28. In addition, the rubber cover 53 includes a large tubular portion 98 contiguous with the second cover portion 97. The large tubular portion 98 is adapted to be located closely to the lower stationary disk 29 in spaced relationship to an outer circumferential surface 101 of the lower damping member 28.

Formed on the second cover portion 97 is the rib 55 having a desired radius. The rib 55 is concentric with the projection 44, the small tubular portion 93 and the large tubular portion 98. The rib 55 has a quadrangular, semicircular or triangular cross-section.

Figure 5:
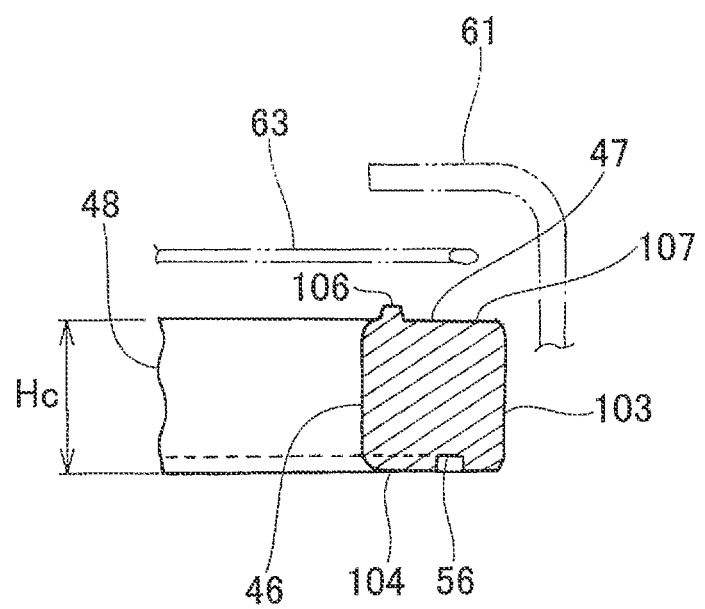
FIG. 5 is an enlarged cross-sectional view taken along line 5-5 of FIG. 4.

As shown in FIGS. 3 to 5, the collar 48 is ring-shaped and has a quadrangular cross-section. The quadrangular cross-section is defined by the inner circumferential surface 46, an outer circumferential surface 103, the upper surface 47 and a lower surface 104.

The inner circumferential surface 46 of the collar 48 has a radius set such that the inner circumferential surface 46 contacts the small tubular portion 93 of the rubber cover 53. The radius of the inner circumferential surface 46 is approximately equal to a radius of the opening portion 41. The outer circumferential surface 103 of the collar 48 has a radius which is approximately equal to a radius of the lower damping member 28. The height Hc of the collar 48 is approximately equal to the height Hb of the projection 44.

The upper surface 47 of the collar 48 faces the vehicular body panel 17. Formed on the upper surface 47 are three lugs 106 which are equally spaced from one another and located closely to the inner circumferential surface 46. The lugs 106 are adapted to be joined to the vehicular body panel 17 by projection welding. The upper surface 47 defines a seat 107 formed radially outward of the lugs 106. The sealer 63 is to be applied to the seat 107.

It is noted that the projection welding is a known welding. The lower surface 104 faces the lower damping member 28 in close contact with the second cover portion 97.

Assemblage of the damper mount structure is discussed with reference to mainly FIGS. 3 and 4.

First, the collar 48 with the sealer 63 applied thereto is attached to the lower surface 43 of the first fastening seat 71 of the damper base 61 at welds (the lugs 106 melted) by projection welding.

The adhesive 64 is applied to the first fastening seat 71 of the damper base 61 for adhesion of the second fastening seat 77 to the first fastening seat 71 through the adhesive 64. In so doing, adhesive may applied to the first rib 73 to join the first rib 73 and the third rib 81 together. Thereafter, the rod 21 provided with the sleeve member 31, the lower damping member 28 and the rubber cover 53 is inserted from below the vehicular body 13 through the damper base 61 joined to the vehicular body 13.

The upper damping member 27 fits around the inserted rod 21 (the sleeve member 31) and the upper stationary disk 25 fits around the rod 21. Finally, the nut 26 is screwed onto the rod 21 in such a manner as to provide a predetermined axial force. This finishes the assemblage of the damper mounts structure.

Desirably, a member for preventing loosening of the nut 26 screwed onto the rod 21 is attached to the nut 26.

Advantages provided by the damper mount structure in the first embodiment are discussed hereinbelow.

The assemblage of the damper mount structure in embodiment 1 does not require a conventional process of interposing a tubular member between the opening portion 41 of the vehicular body panel 17 and the projection 44. This results in reduction in the number of parts of the damper mount structure as well as in facilitation of the assemblage of the damper mount structure.

When the damper 14 absorbs a load from the rear wheel 35 inclining the rod 21 (for example, in a direction of an arrow 3), the inclined rod 21 applies a force to the vehicular body 13 through the projection 44 and the collar 48. During application of the force to the vehicular body 13, the projection 44 presses the collar 48, whereupon, because of approximately the same height as that of the collar 48, the projection 44 does not contact the opening portion 41 of the vehicular body panel 17. Since the projection 44 does not contact the opening portion 41, there is no need to interpose any tubular member between the opening portion 41 of the vehicular body panel 17 and the projection 44. This results in reduction in the number of parts of the damper mount structure as well as in facilitation of assemblage of the damper mount structure.

Further, the beveled corner 51 reduces stress concentration occurring in the upper damping member 27 along the opening portion 41.

Figure 6B:
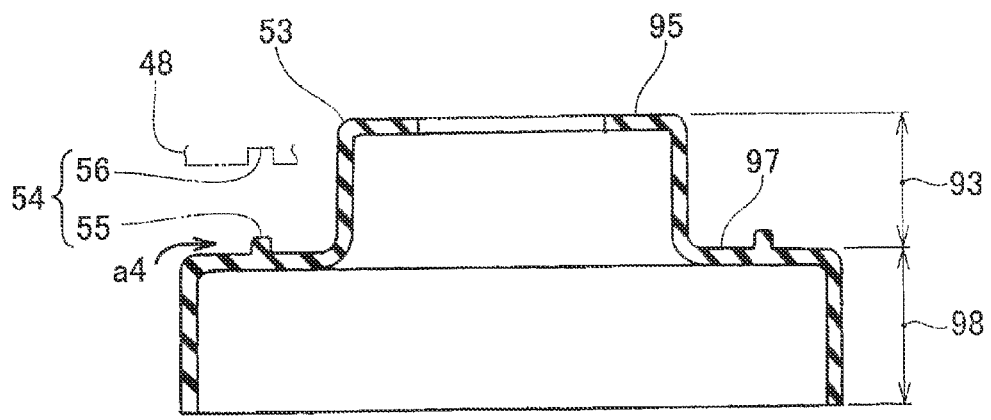
FIG. 6B is a cross-sectional view taken along line b-b of FIG. 6A.

Furthermore, since the rib 55 of the rubber cover 53 fits in the groove 56 of the collar 48 in close contact therewith, water having splashed from below the vehicle 11, as indicated by an arrow a2, starts to enter between the collar 48 and the rubber cover 53, as indicated by an arrow a4 of FIG. 6B, but stops flowing at the rib 55 and the groove 56. This prevents water from flowing between the collar 48 and the rubber cover 53.

Embodiment 2

Figure 7:
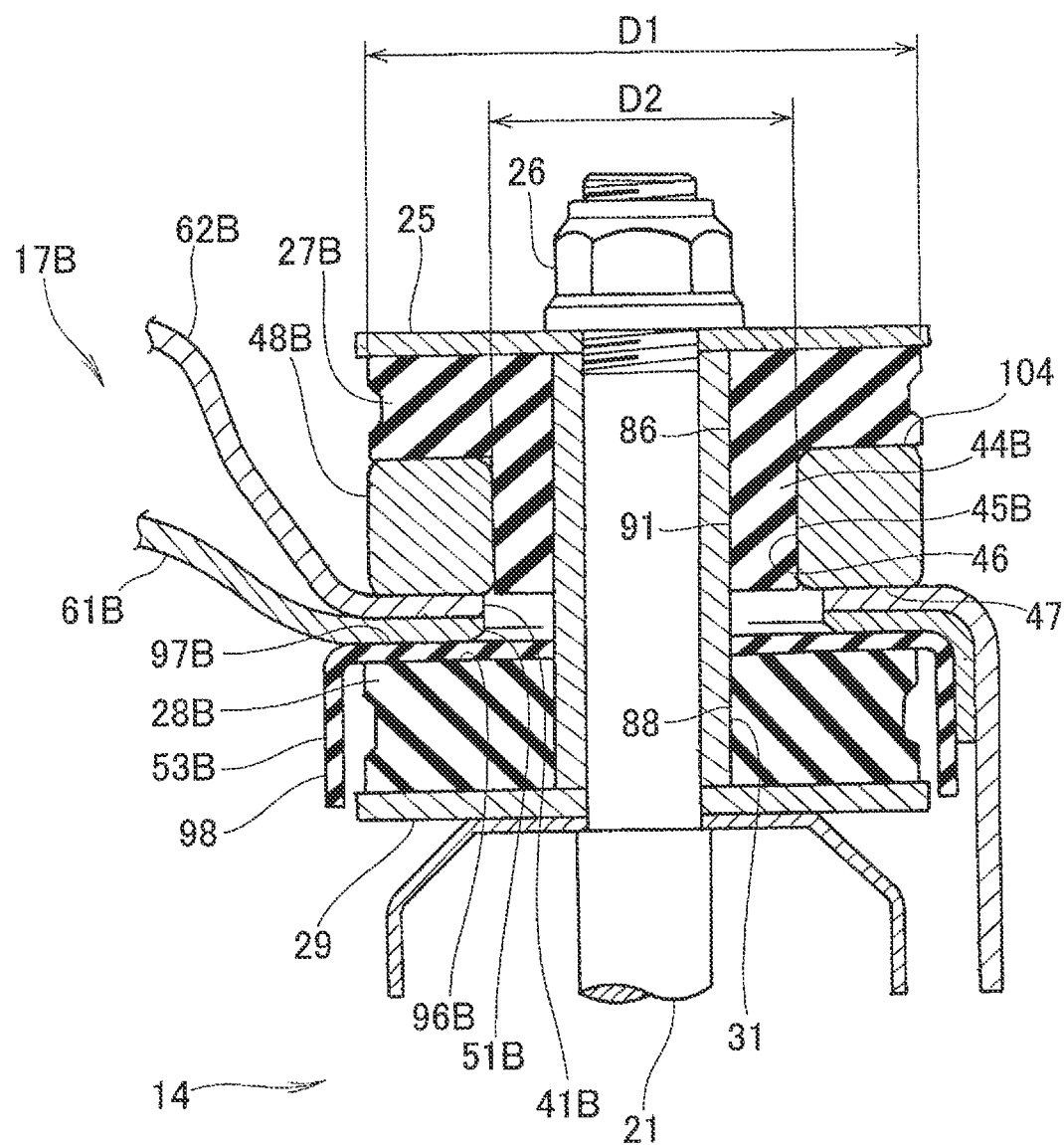
FIG. 7 is a cross-sectional view of a damper mount structure in a second embodiment of the present invention.

A damper mount structure in a second embodiment is discussed with reference to FIG. 7.

It is noted that the same parts of the damper mount structure in the second embodiment which correspond to those in the first embodiment are designated by the same reference numerals and their descriptions are omitted.

The damper mount structure in the second embodiment includes an annular projection 44B protruding from an upper damping member 27B to a lower damping member 28B. The projection 44B has an outer diameter D2 smaller than an outer diameter D1 of the upper damping member 27B. The damper mount structure also includes a collar 48B having an inner circumferential surface 46 fitting around an outer circumferential surface 45B of the projection 44B in contact therewith. The collar 48B also has a lower surface 47 contiguous with the inner circumferential surface 46 and fixed to a vehicular body panel 17B. The collar 48B has approximately the same height from an upper surface 104 to the lower surface 47 as that of the projection 44B. The vehicular body panel 17B has an opening portion 41B including a beveled corner 51B located on a side of the lower damping member 28B. The collar 48B has a lug 106 (FIG. 5) on an end surface thereof.

The lower damping member 28B is covered by a rubber cover 53B interposed between the vehicular body panel 17B and the lower damping member 28B. The rubber cover 53B has a cover portion 97B defining a large end surface of the rubber cover 53b. The cover portion 97B overlies and contacts an entire end surface 96B of the lower damping member 28B.

The damper mount structure in the second embodiment has the same advantages as those of the damper mount structure in the first embodiment, as discussed below. That is, there is no need to interpose any tubular member between the opening portion 41B of the vehicular body panel 17B and the projection 44B. This results in reduction in the number of parts of the damper mount structure as well as in facilitation of assemblage of the damper mount structure.

When the damper 14 absorbs a load from the rear wheel 35 inclining the rod 21 (for example, in a direction of an arrow 3), the inclined rod 21 applies a force to the vehicular body 13 through the projection 44B and the collar 48B. During application of the force to the vehicular body 13, the projection 44B presses the collar 48B, whereupon, because of approximately the same height as that of the collar 48B, the projection 44B does not contact the opening portion 41B of the vehicular body panel 17B. That is, there is no need to interpose any tubular member between the opening portion 41B of the vehicular body panel 17B and the projection 44B.

Although the damper mount structure in the second embodiment does not include a water entry preventing mechanism 54, close contact between the vehicular body panel 17B and the rubber cover 53B ensures prevention of entry of water from an underside of the vehicular body panel such as a road surface to the vehicular body panel.

The beveled corner 51B reduces stress concentration occurring in the rubber cover 53B along the opening portion 41B.

The damper mount structure according to the present invention may be used for a damping mechanism other than a suspension system as well as for a damper of the suspension system.

INDUSTRIAL APPLICABILITY

The damper mount structure according to the present invention is suitable in use for a damper of a suspension system.

REFERENCE SIGNS LIST 12 suspension system (rear suspension system)
14 damper
17 vehicular body panel
21 rod
22 end portion of rod (mounting shaft portion)
25 upper stationary disk
26 nut
27 upper damping member
28 lower damping member
29 lower stationary disk
41 opening portion
42 upper surface of the vehicular body panel
43 lower surface of the vehicular body panel
44 projection
45 outer circumferential surface of projection
46 inner circumferential surface of collar
47 end surface of collar
48 collar
51 beveled corner
53 rubber cover
54 water entry preventing mechanism
55 rib
56 groove
61 damper base
62 damper stiffener
63 sealer
64 adhesive
D1 outer diameter of one (lower) damping member
D2 smaller outer diameter
Hb height of projection
Hc height of collar

The invention claimed is:

1. A damper mount structure comprising:
a rod of a damper of a suspension system, the rod having an end portion;
a vehicular body panel having an opening portion, the end portion of the rod being inserted through and fastened to the opening portion;
an upper stationary disk facing toward an upper surface of the vehicular body panel and subjected to a pressure of a nut screwed onto the end portion of the rod;
a lower stationary disk facing toward a lower surface of the vehicular body panel and opposed to the upper stationary disk with the vehicular body panel interposed between the upper stationary disk and the lower stationary disk;
an annular upper damping member contacting the vehicular body panel and compressed by the upper stationary disk, the end portion of the rod fitting through the annular upper damper;
an annular lower damping member disposed between the vehicular body panel and the lower stationary disk in contact with the lower stationary disk;
an annular projection protruding from one of the upper damping member and the lower damping member toward the other one of the upper damping member and the lower damping member, the projection having an outer diameter smaller than an outer diameter of the one of the upper damping member and the lower damping member; and
a collar having an inner circumferential surface fitting around an outer circumferential surface of the projection in such a manner as to contact the outer circumferential surface, the collar having one end surface and an opposite end surface, the one end surface being contiguous with the inner circumferential surface and fixed to the vehicular body panel, the collar having a height from the opposite end surface to the one end surface, the height of the collar being substantially equal to a height of the projection; and
the opening portion of the vehicular body panel contacting the other one of the upper damping member and the lower damping member and having a beveled corner.

2. The damper mount structure of claim 1, wherein the vehicular body panel has a lower surface facing downwardly of a vehicle,
wherein the projection is formed on the lower damping member,
wherein the collar is integrally fixed to the lower surface of the vehicular body panel, and
wherein the beveled corner is contiguous with the upper surface of the vehicular body panel and faces toward the upper damping member.

3. The damper mount structure of claim 2, wherein the vehicular body panel comprises a damper base contiguous with a vehicular body, and a damper stiffener overlying the damper base and contacting the upper damping member, the damper mount structure further comprising a watertight sealer interposed between the collar and the damper base, the collar being fixed to the damper base by projection welding.

4. The damper mount structure of claim 3, wherein the damper stiffener is joined to the damper base by adhesives.

5. The damper mount structure of claim 2, wherein the upper damping member and the lower damping member are made from urethane rubber.

6. The damper mount structure of claim 1, further comprising a rubber cover covering the lower damping member and the projection, the rubber cover being interposed between the collar and the lower damping member and between the collar and the projection.

7. The damper mount structure of claim 6, further comprising a water entry preventing mechanism formed between the collar and the rubber cover for preventing entry of water from an underside of a vehicle, the mechanism including a rib formed on one of the collar and the rubber cover and a groove formed on the other one of the collar and the rubber cover and receiving the rib in close contact with the rib.

8. The damper mount structure of claim 7, wherein the vehicular body panel comprises a damper base contiguous with a vehicular body, and a damper stiffener overlying the damper base and contacting the upper damping member, the damper mount structure further comprising a watertight sealer interposed between the collar and the damper base, the collar being fixed to the damper base by projection welding.

9. The damper mount structure of claim 8, wherein the damper stiffener is joined to the damper base by adhesives.

10. The damper mount structure of claim 7, wherein the upper damping member and the lower damping member are made from urethane rubber.

11. The damper mount structure of claim 6, wherein the vehicular body panel comprises a damper base contiguous with a vehicular body, and a damper stiffener overlying the damper base and contacting the upper damping member, the damper mount structure further comprising a watertight sealer interposed between the collar and the damper base, the collar being fixed to the damper base by projection welding.

12. The damper mount structure of claim 11, wherein the damper stiffener is joined to the damper base by adhesives.

13. The damper mount structure of claim 6, wherein the upper damping member and the lower damping member are made from urethane rubber.

14. The damper mount structure of claim 1, wherein the vehicular body panel comprises a damper base contiguous with a vehicular body, and a damper stiffener overlying the damper base and contacting the upper damping member, the damper mount structure further comprising a watertight sealer interposed between the collar and the damper base, the collar being fixed to the damper base by projection welding.

15. The damper mount structure of claim 14, wherein the damper stiffener is joined to the damper base by adhesives.

16. The damper mount structure of claim 15, wherein the upper damping member and the lower damping member are made from urethane rubber.

17. The damper mount structure of claim 14, wherein the upper damping member and the lower damping member are made from urethane rubber.

18. The damper mount structure of claim 1, wherein the upper damping member and the lower damping member are made from urethane rubber.

\* \* \* \* \*